US012682679B2

(12) United States Patent
Kim et al.

(10) Patent No.: US 12,682,679 B2
(45) Date of Patent: Jul. 14, 2026

(54) METHOD AND APPARATUS FOR FAKE FINGERPRINTS GENERATION, AND TRAINING METHOD OF ARTIFICIAL INTELLIGENCE FOR IDENTIFYING FAKE FINGERPRINTS

(71) Applicant: Suprema Inc., Seongnam-si (KR)

(72) Inventors: Beom Jun Kim, Seongnam-si (KR); Jong Man Lee, Seongnam-si (KR); Hochul Shin, Seongnam-si (KR); Jae Hyun Park, Seongnam-si (KR); Young Mook Kang, Seongnam-si (KR)

(73) Assignee: Suprema Inc., Seongnam-si (KR)

( * ) Notice: Subject to any disclaimer, the term of this patent is extended or adjusted under 35 U.S.C. 154(b) by 0 days.

(21) Appl. No.: 18/978,858

(22) Filed: Dec. 12, 2024

(65) Prior Publication Data

US 2026/0127912 A1 May 7, 2026

(51) Int. Cl.
*G06V 40/12* (2022.01)
*G06V 10/774* (2022.01)

(52) U.S. Cl.
CPC ........ *G06V 40/1382* (2022.01); *G06V 10/774* (2022.01)

(58) Field of Classification Search
CPC ............. G06V 10/774; G06V 40/1359; G06V 40/1376; G06V 40/40
See application file for complete search history.

(56) References Cited

U.S. PATENT DOCUMENTS

| | | | | |
|---|---|---|---|---|
| 12,014,569 B2* | 6/2024 | Riazi | ................. | G06F 18/24143 |
| 2016/0070968 A1* | 3/2016 | Gu | ........................... | G06T 7/337 |
| | | | | 382/125 |
| 2021/0182583 A1* | 6/2021 | Kim | .................... | G06V 40/1394 |
| 2021/0365666 A1* | 11/2021 | Cho | ........................ | G06V 40/50 |
| 2022/0327189 A1* | 10/2022 | Belli | ........................ | G06F 21/32 |
| 2023/0326187 A1* | 10/2023 | Naresh | .................... | G06V 10/82 |
| | | | | 382/124 |
| 2024/0144729 A1* | 5/2024 | Septiana | ................ | G06N 3/096 |

FOREIGN PATENT DOCUMENTS

| | | | | |
|---|---|---|---|---|
| CN | 116246353 A | * | 6/2023 | ............. G06V 40/45 |

OTHER PUBLICATIONS

English translation of CN-116246353-A (Year: 2023).*

* cited by examiner

*Primary Examiner* — Lixi C Simpson
(74) *Attorney, Agent, or Firm* — Bridgeway IP Law Group, PLLC; Jihun Kim

(57) ABSTRACT

There is provided a method for training a fake fingerprint detection model, performed by a training device for the fake fingerprint detection model, the method comprising: acquiring a physical fake fingerprint image generated in a physical manner targeting a finger; providing generation constraints and a unique identification information to a training fingerprint image generation model; generating a training fingerprint image by using the training fingerprint image generation model, so that the unique identification information of the training fingerprint image is mapped onto a real fingerprint of the finger; and training the fake fingerprint detection model using the physical fake fingerprint image and the training fingerprint image in a transfer learning manner or an ensemble learning manner.

17 Claims, 14 Drawing Sheets

150

260

START

INPUT FINGERPRINT IMAGE AND
GENERATION CONSTRAINTS    S410

EXTRACT UNIQUE IDENTIFICATION INFORMATION    S420

CALCULATE GENERATION ERROR RATE AND
PERFORM TRAINING    S430

S440

IS TRAINING COMPLETED?    NO

YES

PROVIDE WEIGHTS TO TRAINING
FINGERPRINT IMAGE ACQUISITION UNIT    S450

END

METHOD AND APPARATUS FOR FAKE FINGERPRINTS GENERATION, AND TRAINING METHOD OF ARTIFICIAL INTELLIGENCE FOR IDENTIFYING FAKE FINGERPRINTS

CROSS-REFERENCE TO RELATED APPLICATION

This application claims priority to Korean Patent Application No. 10-2024-0156337, filed on Nov. 6, 2024, the entirety of which is incorporated herein by reference for all purposes.

TECHNICAL FIELD

The present disclosure relates to a method and device for generating fake fingerprints, and a method for training an artificial intelligence model for detecting fake fingerprints. This work was supported by Institute of Information & communications Technology Planning & Evaluation (IITP) grant funded by the Korea government (Ministry of Science and ICT) (Project unique No.: 2710007816; Project No.: II201787; R&D project: Information and Communication Broadcasting Innovation Talent Training (R&D); Research Project Title: Development of communication/computing convergence innovation technology for super-intelligent services; and Project period: 2024.01.01.~2024.12.31.).

BACKGROUND

Fingerprint recognition is one of the most widely used biometric technologies today, and is rapidly replacing passwords composed of letters or patterns in daily life. Many people perceive fingerprint recognition technology as being more resistant to leakage or duplicate than passwords composed of letters or patterns, however fingerprints are not free from the risk of duplication. Therefore, if a fingerprint is exposed and duplicated by a third party, the duplicated fake fingerprint may be used to obtain authentication.

Meanwhile, fingerprints can be easily exposed to the outside world, such as being left on objects touched by the hand, which leads to a security vulnerability. Accordingly, the development of technologies to distinguish between real fingerprints and fake fingerprints (e.g., the development of fake fingerprint detection technology using artificial intelligence) is actively underway.

However, there is a limitation in improving the performance of the fake fingerprint detection models due to insufficient training data to train artificial intelligence algorithms used for detect fake fingerprints.

SUMMARY

In view of the above, the present disclosure provides a method for generating a large amount of training data required to training an artificial intelligence model for detecting fake fingerprints.

In addition, the present disclosure provides a method for training a fake fingerprint detection model using training data generated by the aforementioned method.

However, the problem to be solved by the present disclosure is not limited to that mentioned above, and other problems to be solved that are not mentioned may be clearly understood by those of ordinary skill in the art to which the present disclosure belongs from the following description.

In accordance with an aspect of the present disclosure, there is provided a method for training a fake fingerprint detection model, performed by a training device for the fake fingerprint detection model, the method comprising: acquiring a physical fake fingerprint image generated in a physical manner targeting a finger; providing generation constraints and a unique identification information to a training fingerprint image generation model; generating a training fingerprint image by using the training fingerprint image generation model, so that the unique identification information of the training fingerprint image is mapped onto a real fingerprint of the finger; and training the fake fingerprint detection model using the physical fake fingerprint image and the training fingerprint image in a transfer learning manner or an ensemble learning manner.

In the transfer learning manner, the physical fake fingerprint image may be used for pre-training and the training fingerprint image may be used for fine-tuning.

In the pre-training, an image with masking applied to a portion of the physical fake fingerprint image may be provided as an input for training, and an image with no masking applied may be provided as a correct answer for training.

The fake fingerprint detection model may include a physical fake fingerprint detection model and a training fake fingerprint detection model, and wherein in the training of the ensemble learning manner, the physical fake fingerprint detection model and the training fake fingerprint detection model may be trained separately, the physical fake fingerprint detection model may be trained by receiving the physical fake fingerprint image as an input for training and receiving whether the received image may be fake or not as a correct answer for training, and the training fake fingerprint detection model may be trained by receiving the training fingerprint image as an input for training and receiving whether the received image is fake or not as a correct answer for training.

The unique identification information may include at least one of first identification information based on start points, end points and branch points of ridges in the fingerprint of the finger, second identification information based on orientations of the ridges, and third identification information based on a distribution density of the ridges.

The generation constraints may include information about a sensor that identifies the fingerprint, information about surrounding environment in which the fingerprint is identified, and labeling information about the fingerprint.

The labeling information may include information about a type of physical means used to generate the physical fake fingerprint image.

The training fingerprint image generation model may be trained to generate different training fingerprint images based on conditions included in the generation constraints while freezing the unique identification information.

The training fingerprint image generation model may acquire random noise and generate different training fingerprint images according to the random noise even when the same generation constraints are applied.

In accordance with another aspect of the present disclosure, there is provided a device for training a fake fingerprint detection model, the device comprising: a memory storing computer-executable instructions; and a processor for executing the instructions to: acquire a physical fake fingerprint image generated in a physical manner targeting a finger; provide generation constraints and a unique identification information to a training fingerprint image generation model; generate a training fingerprint image by using the training fingerprint image generation model, so that the unique identification information of the training fingerprint image is mapped onto a real fingerprint of the finger; and train the fake fingerprint detection model using the physical fake fingerprint image and the training fingerprint image in a transfer learning manner or an ensemble learning manner.

In accordance with another aspect of the present disclosure, there is provided a non-transitory computer-readable recording medium storing computer-executable instructions, wherein the computer-executable instructions, when executed by a processor, cause the processor to perform a method for training a fake fingerprint detection model, the method comprising: acquiring a physical fake fingerprint image generated in a physical manner targeting a finger; providing generation constraints and a unique identification information to a training fingerprint image generation model; generating a training fingerprint image by using the training fingerprint image generation model, so that the unique identification information of the training fingerprint image is mapped onto a real fingerprint of the finger; and training the fake fingerprint detection model using the physical fake fingerprint image and the training fingerprint image in a transfer learning manner or an ensemble learning manner.

According to one embodiment of the present disclosure, a small amount of original fingerprint images can be augmented to obtain a large amount of training fingerprint images. Accordingly, the performance of the artificial intelligence model for detecting fake fingerprints trained based on the training fingerprint images can be improved.

Further, various fingerprint images, which include information that may vary due to external factors such as finger moisture, the surrounding environment, or the characteristics of the sample used to create the fake fingerprint, can be generated. Accordingly, the performance of the artificial intelligence model for detecting fake fingerprints trained based on the fingerprint images can be improved.

In addition, the performance of the fake fingerprint detection model can be further improved by training the fake fingerprint detection model through transfer learning or ensemble learning using the training data generated by the aforementioned method.

BRIEF DESCRIPTION OF THE DRAWINGS

FIG. 7 is an example diagram showing the entirety of a training method for the training fingerprint image generation model according to one embodiment and a method for generating a training fingerprint image using the trained model.

DETAILED DESCRIPTION

Figure 1:
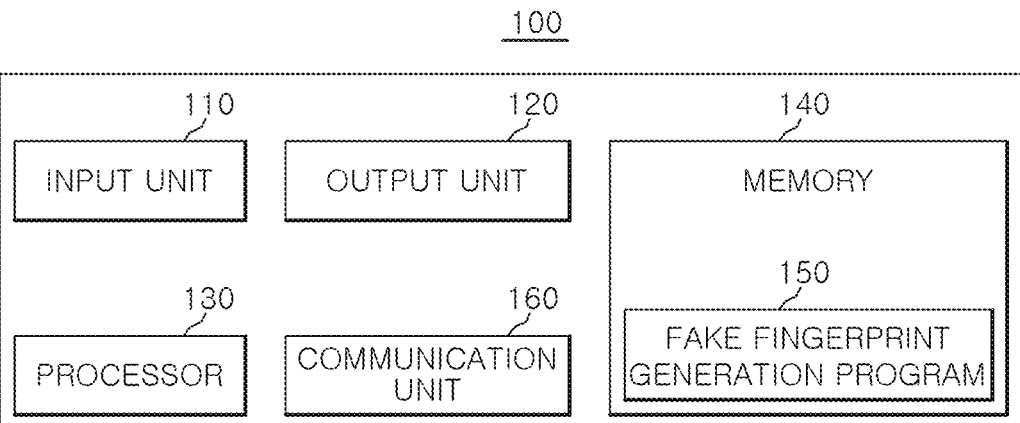
FIG. 1 is a block diagram exemplarily showing a fake fingerprint generation device 100 according to one embodiment.

The advantages and features of the embodiments and the methods of accomplishing the embodiments will be clearly understood from the following description taken in conjunction with the accompanying drawings. However, embodiments are not limited to those embodiments described, as embodiments may be implemented in various forms. It should be noted that the present embodiments are provided to make a full disclosure and also to allow those skilled in the art to know the full range of the embodiments. Therefore, the embodiments are to be defined only by the scope of the appended claims.

Terms used in the present specification will be briefly described, and the present disclosure will be described in detail.

In terms used in the present disclosure, general terms currently as widely used as possible while considering functions in the present disclosure are used. However, the terms may vary according to the intention or precedent of a technician working in the field, the emergence of new technologies, and the like. In addition, in certain cases, there are terms arbitrarily selected by the applicant, and in this case, the meaning of the terms will be described in detail in the description of the corresponding invention. Therefore, the terms used in the present disclosure should be defined based on the meaning of the terms and the overall contents of the present disclosure, not just the name of the terms.

When it is described that a part in the overall specification "includes" a certain component, this means that other components may be further included instead of excluding other components unless specifically stated to the contrary.

In addition, a term such as a "unit" or a "portion" used in the specification means a software component or a hardware component such as FPGA or ASIC, and the "unit" or the "portion" performs a certain role. However, the "unit" or the "portion" is not limited to software or hardware. The "portion" or the "unit" may be configured to be in an addressable storage medium, or may be configured to reproduce one or more processors. Thus, as an example, the "unit" or the "portion" includes components (such as software components, object-oriented software components, class components, and task components), processes, functions, properties, procedures, subroutines, segments of program code, drivers, firmware, microcode, circuits, data, database, data structures, tables, arrays, and variables. The functions provided in the components and "unit" may be combined into a smaller number of components and "units" or may be further divided into additional components and "units".

Hereinafter, the embodiment of the present disclosure will be described in detail with reference to the accompanying drawings so that those of ordinary skill in the art may easily implement the present disclosure. In the drawings, portions not related to the description are omitted in order to clearly describe the present disclosure.

In the present specification, the term "image" may be a single image or a video including multiple images. First, with reference to FIGS. 1 to 7, a method for generating a fake fingerprint image using a training fingerprint image generation model will be described in detail, and then, with reference to FIGS. 8 to 14, a method for training a fake fingerprint detection model using the generated fake fingerprint image will be described in detail.

FIG. 1 is a block diagram exemplarily showing a fake fingerprint generation device 100 according to one embodiment.

As shown in FIG. 1, the fake fingerprint generation device 100 may include an input unit 110, an output unit 120, a processor 130, a memory 140, or a communication unit 160.

For the convenience of explanation, the following description will be given as an example of the fake fingerprint generation device 100 including the input unit 110, the output unit 120, the processor 130, the memory 140, and the communication unit 160, but the present disclosure is not limited thereto. That is, each component may be provided outside the fake fingerprint generation device 100 to operate in a manner that interacts with the fake fingerprint generation device 100.

The input unit 110 may include a user interface for receiving commands, information, etc. used to control the fake fingerprint generation device 100. In addition, the input unit 110 may be a hardware device (e.g., a keyboard, mouse, touch pad, etc.) that can directly receive commands, information, etc. used to control the fake fingerprint generation device 100.

In one embodiment, the input unit 110 may receive a fingerprint image acquired and processed inside the fake fingerprint generation device 100 when a fingerprint of a fingerprint contact subject (e.g., a human finger) comes into contact with a fingerprint contact surface of the fake fingerprint generation device 100. The input unit 110 may include, for example, an image sensor provided in a fingerprint recognition terminal of an access control system. The image sensor may acquire an image of a fingerprint that has come into contact with the fingerprint contact surface by outputting a digital signal which is an electrical signal corresponding to an incident optical signal. The image sensor is an optical fingerprint sensor, and for example, a CCD (charge coupled device) or a CMOS (complementary metal-oxide semiconductor) device may be used as the image sensor. However, the image sensor is not limited to a specific device as long as it detects a fingerprint shape image generated by a light source.

In one embodiment, the input unit 110 may receive information required for generating a fake fingerprint from a user. Specifically, the user may input information including an image by capturing a fingerprint of a finger, a fake fingerprint image obtained from a real fingerprint of a finger, a training fingerprint image generated from a training fingerprint image generation model, unique identification information of the fingerprint, generation constraints, random noise, and information related to the training fingerprint image generation model through the input unit 110.

The output unit 120 may provide the information including the captured image of the fingerprint of the finger, the fake fingerprint image obtained from the real fingerprint of the finger, the training fingerprint image generated from the training fingerprint image generation model, the unique identification information of the fingerprint, the generation constraints, the random noise, and the information related to the training fingerprint image generation model to the user as visual information through an interface.

The processor 130 may control the overall operation of the fake fingerprint generation device 100 to perform the present disclosure.

The processor 130 may load a fake fingerprint generation program 150 and information required for executing the fake fingerprint generation program 150 from the memory 140 to execute the fake fingerprint generation program 150.

The processor 130 may operate to store data received from an external device through the communication unit 160 in the memory 140. In addition, the processor 130 may operate to transmit and receive the captured image of the fingerprint of the finger, the fake fingerprint image obtained from the real fingerprint of the finger, the training fingerprint image generated from the training fingerprint image generation model, the unique identification information of the fingerprint, the generation constraints, the random noise, and the information related to the training fingerprint image generation model to and from an external device through the communication unit 160.

The processor 130 may refer to a processing device such as a microprocessor, a central processing unit (CPU), a graphic processing unit (GPU), a processor core, a multi-processor, an application-specific integrated circuit (ASIC), a field programmable gate array (FPGA), a micro controller unit (MCU), etc., but is not limited to the above-described examples.

The memory 140 may store the fake fingerprint generation program 150 and the information required for executing the fake fingerprint generation program 150. In addition, the memory 140 may also store the processing results by the processor 130.

The fake fingerprint generation program 150 may refer to software including instructions programmed to perform the method according to the present disclosure.

The memory 140 may store the information including the captured image of the fingerprint of the finger, the fake fingerprint image obtained from the real fingerprint of the finger, the training fingerprint image generated from the training fingerprint image generation model, the unique identification information of the fingerprint, the generation constraints, the random noise, and the information related to the training fingerprint image generation model. In addition, the memory 140 may store information received from an external device through the communication unit 160.

The memory 140 may refer to a computer-readable recording medium, such as magnetic media such as a hard disk, a floppy disk, and a magnetic tape, optical media such as a CD-ROM or a DVD, magneto-optical media such as a floptical disk, a random access memory such as a dynamic random access memory (DRAM) or a static random access memory (SRAM), and a hardware device specifically configured to store and execute program instructions such as a flash memory, but is not limited to the above-described examples.

The communication unit 160 may be a wireless communication module capable of performing wireless communication by adopting a communication method such as CDMA, GSM, W-CDMA, TD-SCDMA, WiBro, LTE, EPC, 5G, wireless LAN, Wi-Fi, Bluetooth, Zigbee, WFD (Wi-Fi direct), UWB (ultra wide band), IrDA (infrared data association), BLE (Bluetooth low energy), or NFC (near field communication), but is not limited to the above-described examples.

In addition, the information input and output through the input unit 110 and the output unit 120, the information stored in the memory 140, and the information transmitted and received through the communication unit 160 include all information related to the present disclosure, and are not limited to the above-described examples.

Figure 2:
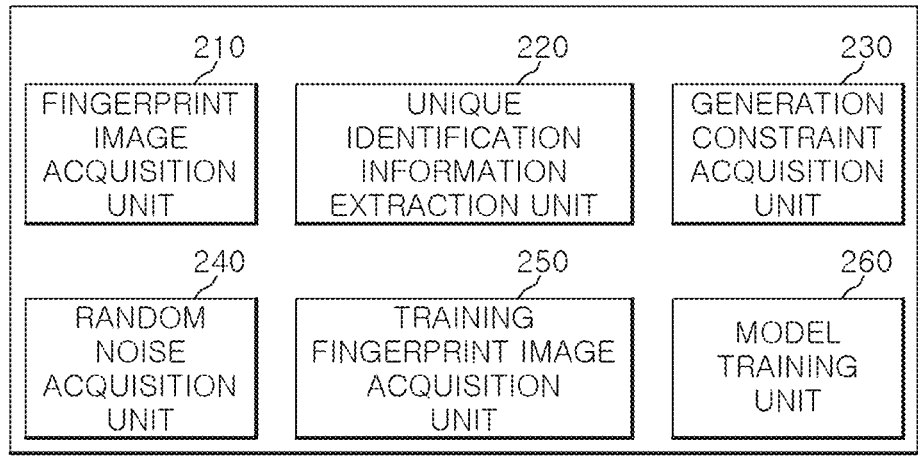
FIG. 2 is a block diagram exemplarily showing the functions of the fake fingerprint generation program 150.

The functions or operations of the fake fingerprint generation program 150 will be examined in detail with reference to FIG. 2.

FIG. 2 is a block diagram exemplarily showing the functions of the fake fingerprint generation program 150.

As shown in FIG. 2, the fake fingerprint generation program 150 may include a fingerprint image acquisition unit 210, a unique identification information extraction unit 220, a generation constraint acquisition unit 230, a random noise acquisition unit 240, a training fingerprint image acquisition unit 250, and a model training unit 260. The fingerprint image acquisition unit 210, the unique identification information extraction unit 220, the generation constraint acquisition unit 230, the random noise acquisition unit 240, the training fingerprint image acquisition unit 250, and the model training unit 260 are exemplary division of the functions of the fake fingerprint generation program 150, and the present disclosure is not limited thereto.

According to one embodiment, the functions of the fingerprint image acquisition unit 210, the unique identification information extraction unit 220, the generation constraint acquisition unit 230, the random noise acquisition unit 240, the training fingerprint image acquisition unit 250, and the model training unit 260 may be combined/separated, and may be implemented as a series of instructions included in at least one program.

The fingerprint image acquisition unit 210, the unique identification information extraction unit 220, the generation constraint acquisition unit 230, the random noise acquisition unit 240, the training fingerprint image acquisition unit 250, and the model training unit 260 may be implemented by the processor 130, and may refer to a data processing device embedded in hardware having a physically structured circuit to perform a function expressed by code or instructions included in the fake fingerprint generation program 150 stored in the memory 140.

The fingerprint image acquisition unit 210 may acquire a fingerprint image targeting a given finger. For example, the fingerprint image acquisition unit 210 may acquire an image obtained by capturing a real fingerprint, or may acquire an image obtained from a training fingerprint image generation model acquired from the real fingerprint. In this case, a fake fingerprint acquired from a real fingerprint may refer to a fake fingerprint artificially generated from the real fingerprint by means of at least one of silicone, latex, paper, and glue, or may refer to a fake fingerprint generated from the training fingerprint image generation model.

The unique identification information extraction unit 220 may extract unique identification information of the fingerprint from the fingerprint image. In this case, the unique identification information may include features shared by the real fingerprint of the finger and the training fingerprint image for the real fingerprint. The unique identification information is information related to ridges and valleys in the fingerprint, and even if a fake fingerprint transformed into various forms by the generation constraints or random noise to be described later is generated, the features can be maintained in the generated fake fingerprint or the features can be transformed within an acceptable range. The unique identification information may be extracted in various ways. For example, the unique identification information may be extracted using an artificial intelligence model such as an easy flow, a transformer-based model, an attention-based model, a convolutional neural network (CNN), etc., and these are known technologies, so detailed descriptions thereof will be omitted.

The ridges and valleys may include information about ridges and valleys in the form of a fingerprint. In one embodiment, the unique identification information may include at least one of first identification information based on start points, end points and branch points of ridges in a fingerprint of a finger, second identification information based on orientations of the ridges, and third identification information based on a distribution density of the ridges.

The generation constraint acquisition unit 230 may acquire generation constraints for the purpose of diversifying the generated training fingerprint images. That is, the generation constraint acquisition unit 230 may acquire generation constraints to diversify the input fingerprint images to generate fake fingerprints. In one embodiment, the generation constraints may include information about a sensor that identifies a fingerprint, information about a surrounding environment in which the fingerprint is identified, and labeling information about the fingerprint. In this case, the information about the surrounding environment in which a fingerprint is identified may include at least one of information about temperature, humidity, illuminance, and pressure. In addition, the labeling information may include information about whether the fingerprint is a real fingerprint or a fake fingerprint and information about the means used to generate the fake fingerprint. For example, the labeling information may include information such as "Fake-Silicone", "Fake-Latex", or "Fake-Wood glue".

The training fingerprint image acquisition unit 250 may acquire a training fingerprint image to be used for training the fake fingerprint detection model based on the unique identification information and the generation constraints.

In one embodiment, when the generation constraints include information about the sensor that identifies a fingerprint or information about the surrounding environment in which the fingerprint is identified, the training fingerprint image acquisition unit 250 may generate training fingerprint images obtained by diversifying the input fingerprint image using at least one of information about temperature, humidity, illuminance, and pressure without forging the input fingerprint image.

In another embodiment, when the generation constraints include information about the sensor that identifies a fingerprint, information about the surrounding environment in which the fingerprint is identified, information about whether the fingerprint in the input fingerprint image is a real fingerprint or a fake fingerprint, and information about the means used to generate the fake fingerprint, the training fingerprint image acquisition unit 250 may generate training fingerprint images obtained by diversifying the input fingerprint image using at least one of information about temperature, humidity, illuminance, and pressure while forging the input fingerprint image using a virtual forgery means.

The random noise acquisition unit 240 may acquire random noise to generate a large amount of training data required for training the fake fingerprint detection model. The training fingerprint image acquisition unit 250 may generate fingerprint images with various distributions from the input fingerprint image through the random noise. The random noise may be represented as high-dimensional vectors, and such vectors may be sampled from a random distribution such as a Gaussian distribution or a uniform distribution. By applying the random noise, a new fingerprint image similar to but different from the input fingerprint image can be generated. In one embodiment, the unique identification information included in the input fingerprint image is not modified by the random noise, but the generation constraints may be modified by the random noise. In another embodiment, the unique identification information included in the input fingerprint image can be modified by the random noise within an acceptable range to generate a new fingerprint image, but the new fingerprint image may still be identified as a fingerprint of the same person when identified through a fingerprint identification device. In other words, the unique identification information may be modified by the random noise, but it may still be classified into the same group when classified by an artificial intelligence model.

The model training unit 260 may train the training fingerprint image generation model based on the unique identification information of the fingerprint extracted from the fingerprint image. In one embodiment, the training fingerprint image generation model may be trained to generate different training fingerprint images based on conditions included in the generation constraints or the random noise while freezing the unique identification information.

In another embodiment, the training fingerprint image generation model may be trained to ensure that the generated training fingerprint images resemble fake fingerprint images for the real fingerprint.

In one embodiment, the model training unit 260 may train the fake fingerprint detection model using at least one of the acquired training fingerprint images and the image acquired from the real fingerprint. This will be described in detail with reference to FIGS. 11 to 14.

As described above, the model training unit 260 may train the training fingerprint image generation model or the fake fingerprint detection model for the features of the fake fingerprint acquired from the real fingerprint or the fake fingerprint generated by the training fingerprint image generation model. In addition, the model training unit 260 may also generate a new fake fingerprint image having new features by combining the features of the fingerprint images used in the gtraining process. Accordingly, it is possible to generate fake fingerprint images with greater diversity than the existing data, which improves the performance of the training fingerprint image generation model or the fake fingerprint detection model.

Figure 3:
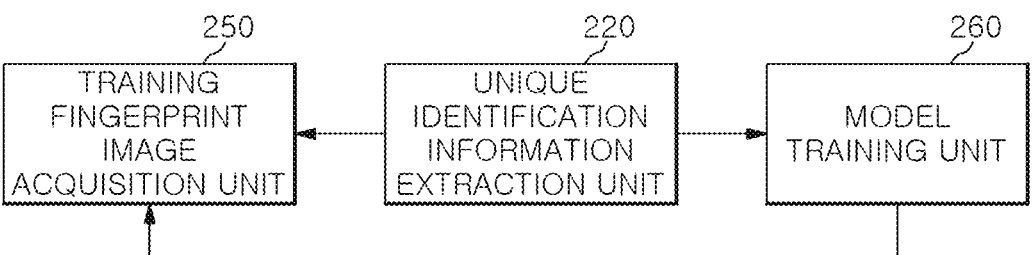
FIG. 3 is an example diagram showing the relationship between the unique identification information extraction unit, the training fingerprint image acquisition unit, and the model training unit of the fingerprint generation program.

FIG. 3 is an example diagram showing the relationship between the unique identification information extraction unit, the training fingerprint image acquisition unit, and the model training unit of the fingerprint generation program.

The unique identification information extraction unit 220 may extract unique identification information of a fingerprint from a fingerprint image. The unique identification information extraction unit 220 may provide the extracted unique identification information to the training fingerprint image acquisition unit 250 and the model training unit 260.

The training fingerprint image acquisition unit 250 may generate a novel fake fingerprint image, which is different from existing ones, by combining unique identification information and predefined generation constraints. To this end, the training fingerprint image acquisition unit 250 may receive unique identification information provided by the unique identification information extraction unit 220 and generation constraints input by the user.

The model training unit 260 may train the training fingerprint image generation model by utilizing the unique identification information extracted from the unique identification information extraction unit 220 and predefined generation constraints. The weights of the model obtained as a result of training the training fingerprint image generation model may be provided to the training fingerprint image acquisition unit 250 to be used when generating a fake fingerprint image.

Figure 4:
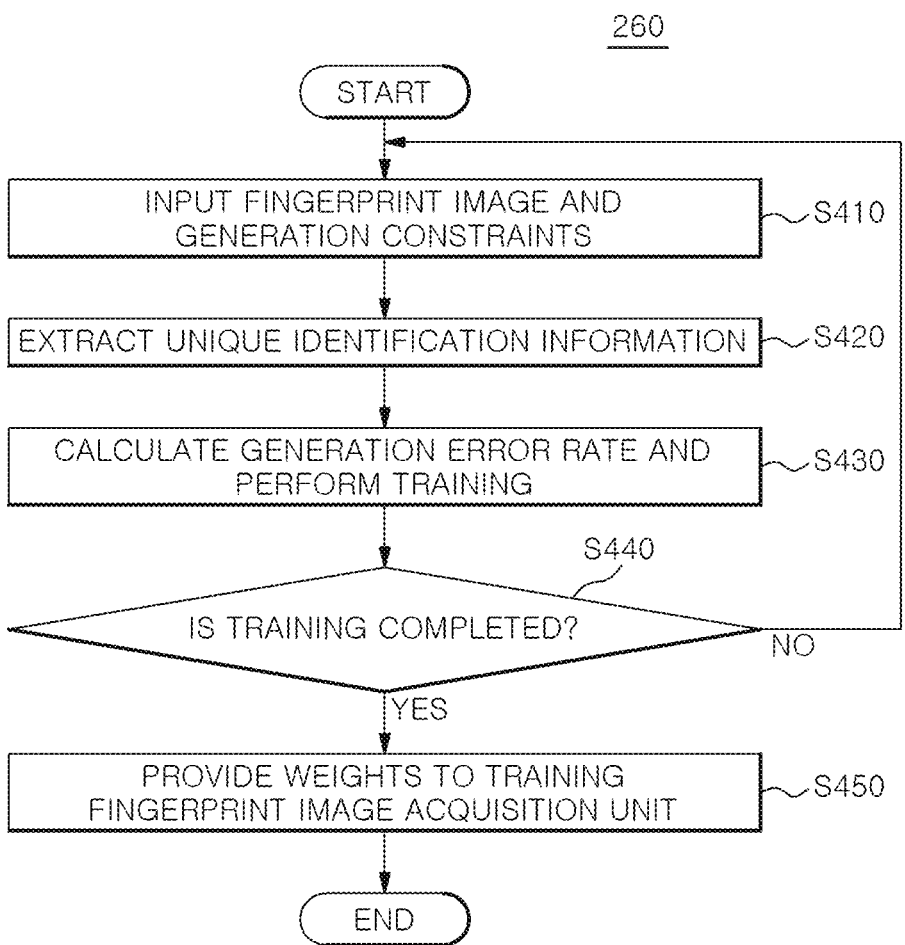
FIG. 4 is a flowchart illustrating an example of the operation of the model training unit 260 of the fake fingerprint generation program 150 according to one embodiment.

FIG. 4 is a flowchart illustrating an example of the operation of the model training unit 260 of the fake fingerprint generation program 150 according to one embodiment.

First, the model training unit 260 may receive a fingerprint image and generation constraints (S410).

Next, the model training unit 260 may extract unique identification information from the input fingerprint image (S420).

Then, the model training unit 260 may compare the generated fake fingerprint image with the input fingerprint image to calculate a generation error rate and update parameters (S430). In this case, random noise may be applied to generate different fake fingerprint images depending on the random noise even when the same generation constraints are input.

It is determined whether the training is completed or not (S440). The model training unit 260 returns to step S410 when it is determined that the training is not yet completed, and may provide weights to the training fingerprint image acquisition unit 250 when it is determined that the training is completed (S450).

Figure 5:
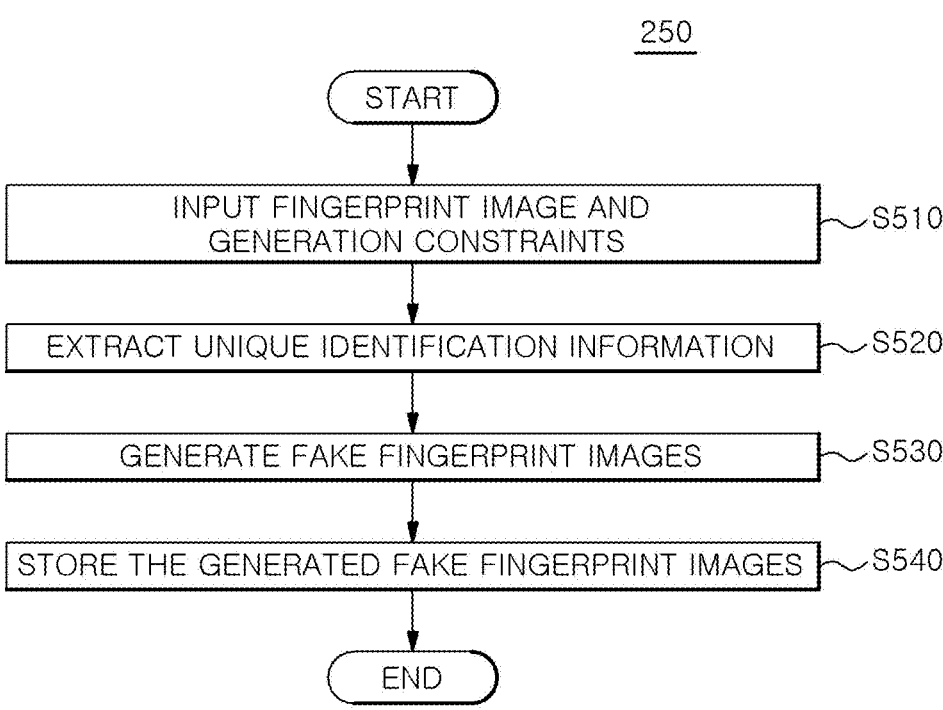
FIG. 5 is a flowchart illustrating an example of the operation of the training fingerprint image acquisition unit 250 of the fake fingerprint generation program 150 according to one embodiment.

FIG. 5 is a flowchart illustrating an example of the operation of the training fingerprint image acquisition unit 250 of the fake fingerprint generation program 150 according to one embodiment.

First, the training fingerprint image acquisition unit 250 may receive a fingerprint image and generation constraints (S510) that are input.

Next, the training fingerprint image acquisition unit 250 may extract unique identification information from the input fingerprint image (S520).

Then, the training fingerprint image acquisition unit 250 may generate fake fingerprint images based on the extracted unique identification information and the generation constraints (S530). In this case, random noise may be applied to generate different fake fingerprint images depending on the random noise even when the same generation constraints are input.

The training fingerprint image acquisition unit 250 may store the generated fake fingerprint images (S540).

Figure 6:
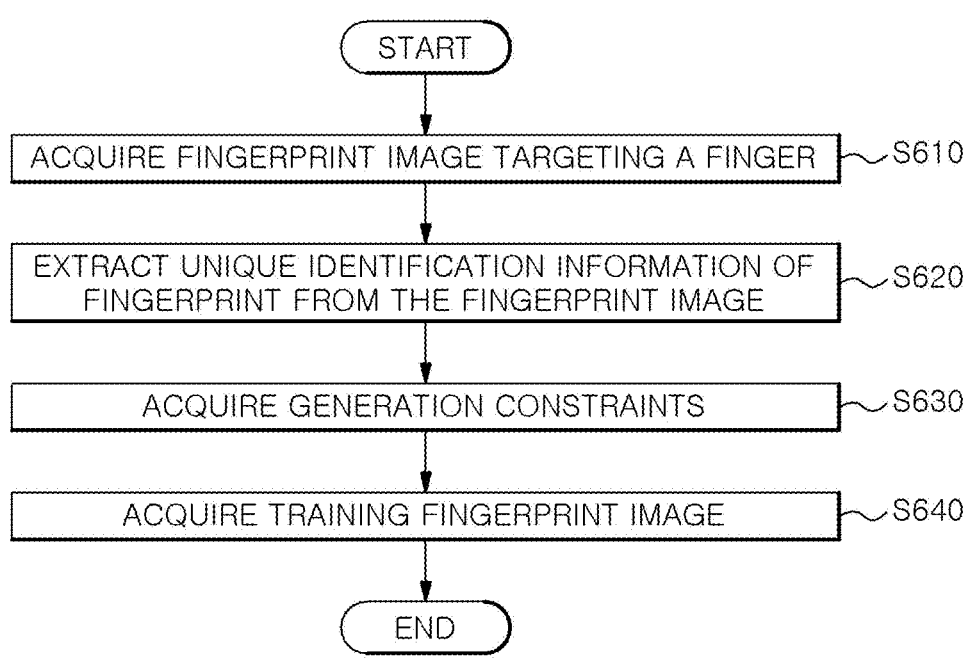
FIG. 6 is a flowchart exemplarily showing a method for generating a fake fingerprint according to one embodiment.

FIG. 6 is a flowchart exemplarily showing a method for generating a fake fingerprint according to one embodiment. In this case, the method illustrated in FIG. 6 may be executed by the fake fingerprint generating device 100 illustrated in FIG. 1. In addition, the flowchart illustrated in FIG. 6 is merely exemplary, and depending on embodiments, the steps may be executed in a different order from that described in the flowchart, or a step not described in the flowchart may be additionally executed, or one or more of the steps described in the flowchart may not be executed.

As shown in FIG. 6, the method for generating a fake fingerprint according to one embodiment includes acquiring a fingerprint image targeting a given finger (S610), extracting unique identification information of a fingerprint from the fingerprint image (S620), acquiring generation constraints for the purpose of diversifying generated training fingerprint images (S630), and providing the unique identification information and the generation constraints to the training fingerprint image generation model to acquire a training fingerprint image to be used for training the fake fingerprint detection model (S640). In this case, the unique identification information includes a feature shared by a real fingerprint of a finger and the training fingerprint image for the real fingerprint.

Figure 7:
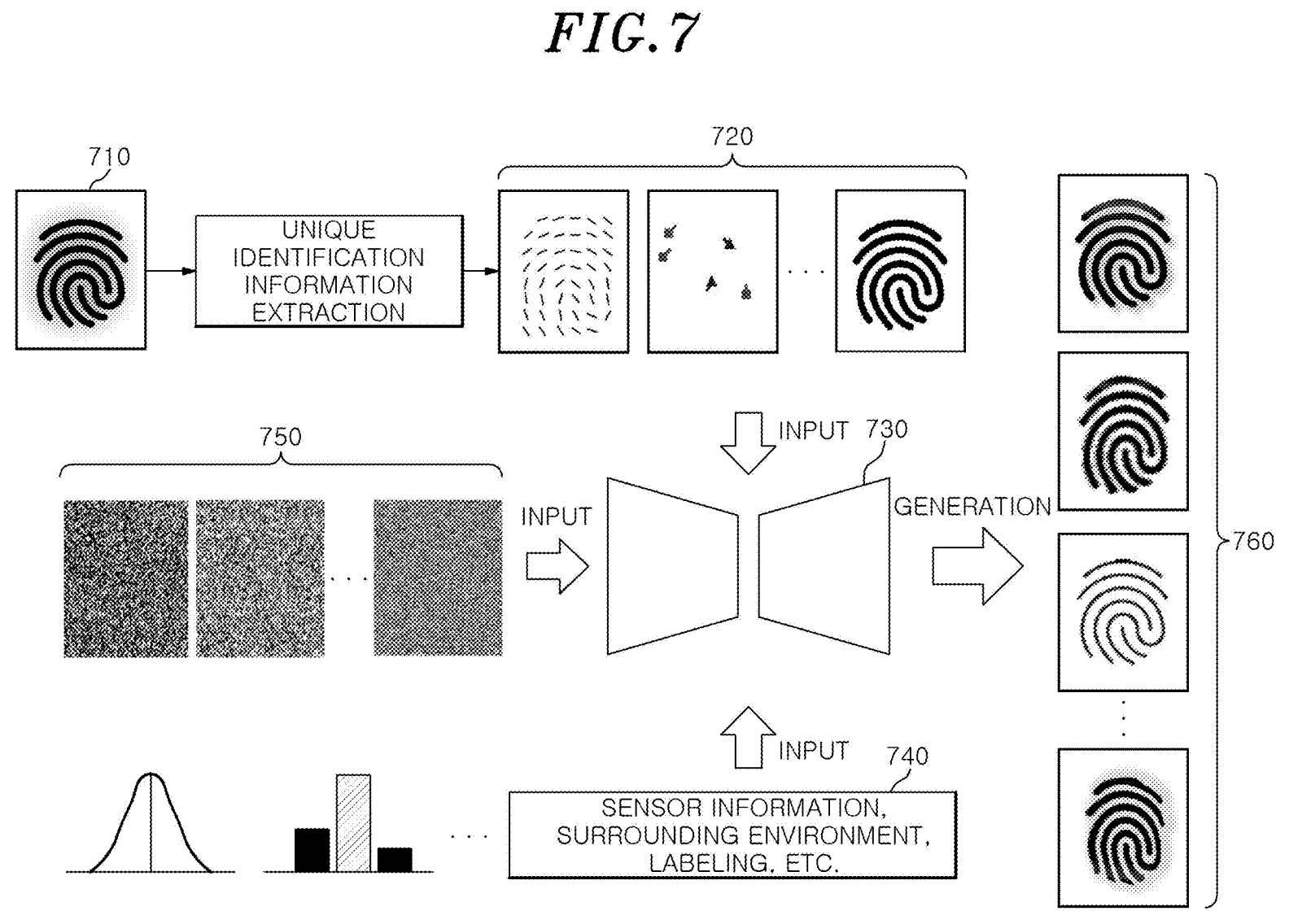

FIG. 7 is an example diagram showing the entirety of a training method for the training fingerprint image generation model according to one embodiment and a method for generating a training fingerprint image using the trained model.

First, regarding the training method for the training fingerprint image generation model, as shown in FIG. 7, an architecture of the model is structured as a combination of an encoder and a decoder. The architecture may be in the form of an autoencoder or a transformer, but the present disclosure is not limited thereto.

For training, multiple training data are prepared. Among the multiple training data, the input provided to the encoder may be a fake fingerprint, or may be an original fingerprint in some embodiments. In this case, as shown in FIG. 7, both generation constraints and random noise may also be provided to the encoder.

In addition, in order to compare the output from the decoder with the input provided to the encoder, the correct answer among the multiple training data may be an augmented fake fingerprint or a fake fingerprint artificially generated from a real fingerprint. This correct answer may be a fake fingerprint that reflects generation constraints or random noise.

When training is performed with the encoder and decoder connected, both the encoder and decoder are trained. In training, a supervised learning method using input and correct answers may be employed.

Meanwhile, if the training for the training fingerprint image generation model has been completed in the manner described above, a training fingerprint image may be generated as described below.

Specifically, when a fingerprint image 710 is input, unique identification information 720 may be extracted from the input fingerprint image 710. In this case, the fingerprint image 710 is a fingerprint image targeting a given finger, and may be an image obtained by capturing a real fingerprint or a fake fingerprint obtained from the real fingerprint.

The unique identification information 720 may include features shared by the real fingerprint of the finger and the training fingerprint image for the real fingerprint. In one embodiment, the unique identification information 720 may include at least one of first identification information based on start points, end points, and branch points of ridges in the fingerprint of the finger, second identification information based on orientations of the ridges, and third identification information based on a distribution density of the ridges.

The training fingerprint image model 730 may receive the unique identification information 720, generation constraints 740, and random noise 750 as inputs to generate training fingerprint images 760.

In one embodiment, the generation constraints may include information about a sensor that identifies a fingerprint, information about the surrounding environment in which the fingerprint is identified, and labeling information about the fingerprint. In this case, the labeling information may include information about whether the fingerprint is a real fingerprint or a fake fingerprint and information about the means used to generate the fake fingerprint. For example, the labeling information may include information such as "Fake-Silicone", "Fake-Latex", or "Fake-Wood glue".

The training fingerprint image model 730 may acquire random noise 750 to generate a large amount of training data required for training the fake fingerprint detection model. The training fingerprint image model 730 may generate training fingerprint images 760 with various distributions from the input fingerprint image 710 through the random noise 750.

In one embodiment, the training fingerprint image model 730 may be trained to generate different training fingerprint images 760 according to conditions included in the generation constraints 740 while freezing the unique identification information 720.

In another embodiment, the training fingerprint image generation model 730 may be trained to ensure that the generated training fingerprint images 760 resemble the fake fingerprint images 710 for the real fingerprint.

Hereinafter, with reference to FIGS. 8 to 14, the method for training the fake fingerprint detection model using the generated fake fingerprint image will be described in detail.

Figure 8:
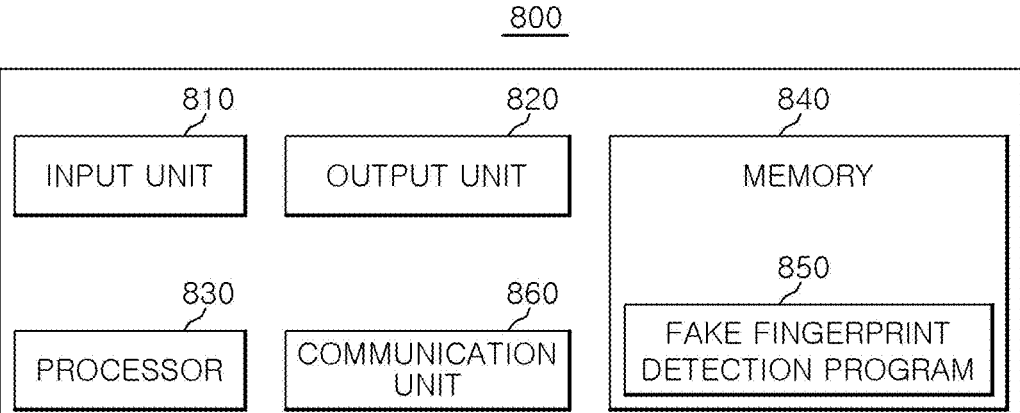
FIG. 8 is a block diagram exemplarily showing a fake fingerprint detection device 800 according to one embodiment.

FIG. 8 is a block diagram exemplarily showing a fake fingerprint detection device 800 according to one embodiment.

As shown in FIG. 8, the fake fingerprint detection device 800 may include an input unit 810, an output unit 820, a processor 830, a memory 840, or a communication unit 860.

For convenience of explanation, the following description will be given as an example of the fake fingerprint detection device 800 including the input unit 810, the output unit 820, the processor 830, the memory 840, and the communication unit 860, but the present disclosure is not limited thereto. That is, each component may be provided outside the fake fingerprint detection device 800 to operate in a manner that interacts with the fake fingerprint detection device 800.

The input unit 810 may include a user interface for receiving commands, information, etc. used to control the fake fingerprint detection device 800. In addition, the input unit 810 may be a hardware device (e.g., a keyboard, mouse, touch pad, etc.) that can directly receive commands, information, etc. used to control the fake fingerprint detection device 800.

In one embodiment, the input unit 810 may receive a fingerprint image acquired and processed inside an external device when a fingerprint of a fingerprint contact subject (e.g., a human finger) comes into contact with a fingerprint contact surface of the external device. The input unit 810 may include, for example, an image sensor provided in a fingerprint recognition terminal of an access control system. The image sensor may acquire an image of a fingerprint that has come into contact with the fingerprint contact surface by outputting a digital signal which is an electrical signal corresponding to an incident optical signal. The image sensor is an optical fingerprint sensor, and for example, a CCD (charge coupled device) or a CMOS (complementary metal-oxide semiconductor) device may be used as the image sensor. However, the image sensor is not limited to a specific device as long as it detects a fingerprint shape image generated by a light source.

In one embodiment, the input unit 810 may receive information required for generating a fake fingerprint from a user. Specifically, the user may input information including an image obtained by capturing a fingerprint of a finger, a fake fingerprint image obtained from a real fingerprint of a finger, a training fingerprint image generated from the training fingerprint image generation model, unique identification information of the fingerprint, generation constraints, random noise, and information related to the training fingerprint image generation model through the input unit 810.

The output unit 820 may provide the information including the captured image of the fingerprint of the finger, the fake fingerprint image obtained from the real fingerprint of the finger, the training fingerprint image generated from the training fingerprint image generation model, the unique identification information of the fingerprint, the generation constraints, the random noise, and the information related to the training fingerprint image generation model to the user as visual information through an interface.

The processor 830 may control the overall operation of the fake fingerprint detection device 800 to perform the present disclosure.

The processor 830 may load a fake fingerprint detection program 850 and information required for executing the fake fingerprint detection program 850 from the memory 840 to execute the fake fingerprint detection program 850.

The processor 830 may operate to store data received from an external device through the communication unit 860 in the memory 840. In addition, the processor 830 may operate to transmit and receive information including data parameters for generating a fake fingerprint, first and second images generated by reflecting the data parameters, and first image variation data, second image variation data, and third image variation data extracted from the first and second images to and from the external device through the communication unit 860.

The processor 830 may refer to a processing device such as a microprocessor, a central processing unit (CPU), a graphic processing unit (GPU), a processor core, a multiprocessor, an application-specific integrated circuit (ASIC), a field programmable gate array (FPGA), a micro controller unit (MCU), etc., but is not limited to the above-described examples.

The memory 840 may store the fake fingerprint detection program 850 and information required for executing the fake fingerprint detection program 850. In addition, the memory 840 may also store the processing result by the processor 830.

The fake fingerprint detection program 850 may refer to software including instructions programmed to perform the method according to the present disclosure.

The fake fingerprint detection program 850 may include a fake fingerprint detection model. In this case, the fake fingerprint detection model may include a physical fake fingerprint detection model or a training fake fingerprint detection model. The physical fake fingerprint detection model may refer to a model that is trained to detect a fake fingerprint by receiving a physical fake fingerprint image as an input for training and receiving whether the received image is fake or not as a correct answer for training. In addition, the training fake fingerprint detection model may refer to a model that is trained to detect a fake fingerprint by receiving a training fingerprint image as an input for training and receiving whether the received image is fake or not as a correct answer for training.

The memory 840 may store the information including the captured image of the fingerprint of the finger, the fake fingerprint image obtained from the real fingerprint of the finger, the training fingerprint image generated from the training fingerprint image generation model, the unique identification information of the fingerprint, the generation constraints, the random noise, and the information related to the training fingerprint image generation model. In addition, the memory 840 may store information received from an external device through the communication unit 860.

The memory 840 may refer to a computer-readable recording medium, such as a magnetic media such as a hard disk, a floppy disk, and a magnetic tape, an optical media such as a CD-ROM or a DVD, magneto-optical media such as a floptical disk, a random access memory such as a dynamic random access memory (DRAM) or a static random access memory (SRAM), and a hardware device specifically configured to store and execute program instructions such as a flash memory, but is not limited to the above-described examples.

The communication unit 860 may be a wireless communication module capable of performing wireless communication by adopting a communication method such as CDMA, GSM, W-CDMA, TD-SCDMA, WiBro, LTE, EPC, 5G, wireless LAN, Wi-Fi, Bluetooth, Zigbee, WFD (Wi-Fi direct), UWB (ultra wide band), IrDA (infrared data association), BLE (Bluetooth low energy), or NFC (near field communication), but is not limited to the above-described examples.

In addition, the information input and output through the input unit 810 and the output unit 820, the information stored in the memory 840, and the information transmitted and received through the communication unit 860 include all information related to the present disclosure, and are not limited to the above-described examples.

Figure 9:
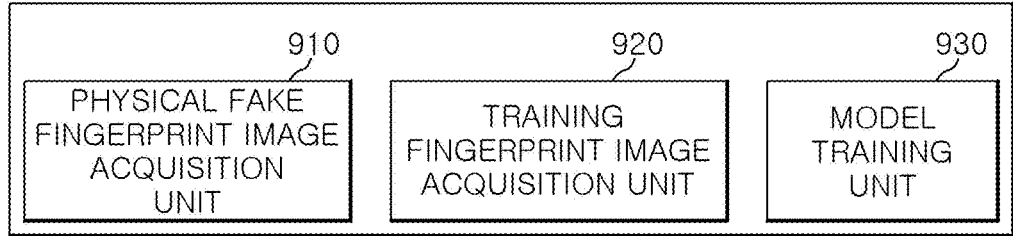
FIG. 9 is a block diagram exemplarily showing the functions of the fake fingerprint detection program 850.

The functions or operations of the fake fingerprint detection program 850 will be examined in detail with reference to FIG. 9.

FIG. 9 is a block diagram exemplarily showing the functions of the fake fingerprint detection program 850.

As shown in FIG. 9, the fake fingerprint detection program 850 may include a physical fake fingerprint image acquisition unit 910, a training fingerprint image acquisition unit 920, and a model training unit 930. The fake fingerprint detection program 850 may be trained through the physical fake fingerprint image acquisition unit 910, the training fingerprint image acquisition unit 920, and the model training unit 930. The physical fake fingerprint image acquisition unit 910, the training fingerprint image acquisition unit 920, and the model training unit 930 are exemplary divisions of the functions of the fake fingerprint detection program 850, and the present disclosure is not limited thereto.

According to one embodiment, the functions of the physical fake fingerprint image acquisition unit 910, the training fingerprint image acquisition unit 920, and the model training unit 930 may be combined/separated, and may be implemented as a series of instructions included in at least one program.

The physical fake fingerprint image acquisition unit 910, the training fingerprint image acquisition unit 920, and the model training unit 930 may be implemented by the processor 830, and may refer to a data processing device embedded in hardware having a physically structured circuit to perform a function expressed as code or instructions included in the fake fingerprint detection program 850 stored in the memory 840.

In one embodiment, the physical fake fingerprint image acquisition unit 910, the training fingerprint image acquisition unit 920, and the model training unit 930 may be included in an external device for training the fake fingerprint detection model included in the fake fingerprint detection program 850.

Figure 10:
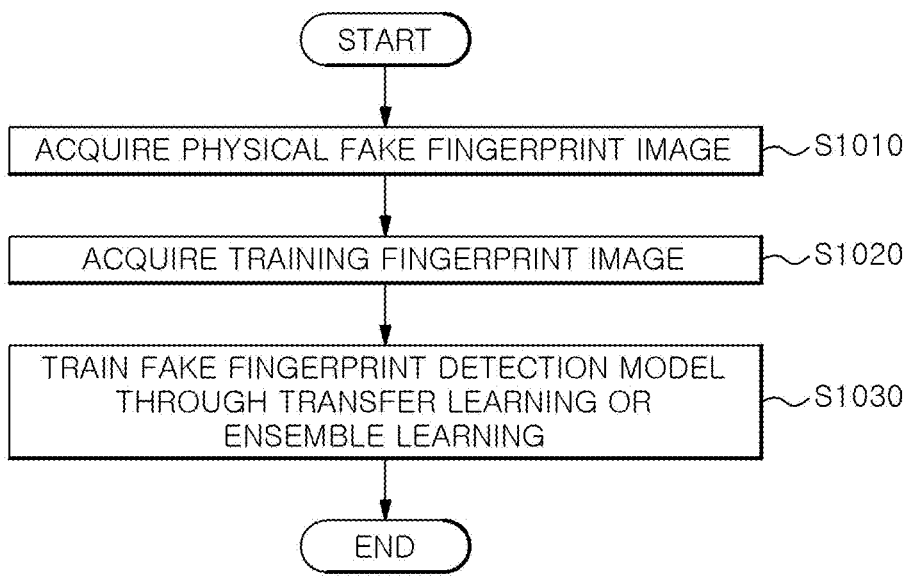
FIG. 10 is a flowchart exemplarily showing a method for training the fake fingerprint detection model according to one embodiment.

FIG. 10 is a flowchart exemplarily showing a method for training the fake fingerprint detection model according to one embodiment.

The physical fake fingerprint image acquisition unit 910 may acquire a physical fake fingerprint image generated in a physical method targeting a given finger (S1010). The physical method may refer to at least one physical forgery means of silicone latex, paper, and glue.

The training fingerprint image acquisition unit 920 may acquire a training fingerprint image generated to share unique identification information of a real fingerprint with the real fingerprint (S1020). In other words, the unique identification information may include features shared between a real fingerprint of a finger and a training fingerprint image for the real fingerprint.

The training fingerprint image may be acquired by providing generation constraints for the purpose of diversifying the generated training fingerprint image and the unique identification information to the training fingerprint image generation model.

The model training unit 930 may train the fake fingerprint detection model in a transfer learning manner or an ensemble learning manner by using the physical fake fingerprint image and the training fingerprint image (S1030).

In the training of the transfer learning manner, the physical fake fingerprint images may be used for pre-training, and the training fingerprint images may be used for fine-tuning. The pre-training may mean that an artificial intelligence model learns general patterns for a given set of data in advance. A first fake fingerprint detection model for pre-training may be pre-trained using a small number of fingerprint images initially acquired, and the weights of the model determined accordingly may be provided to a second fake fingerprint detection model to perform inference. The second fake fingerprint detection model may be transfer-trained using the pre-trained first fake fingerprint detection model to fine-tune the pre-determined weights. That is, after the initial weights of the second fake fingerprint detection model are set to the weights provided by the first fake fingerprint detection model, the second fake fingerprint detection model is additionally trained based on a large number of training fingerprint images acquired later, so that it can be trained efficiently and rapidly.

In one embodiment, training may be performed by using a masked language model (MLM) training method, in which an image with masking applied to a portion of the physical fake fingerprint images are provided as an input for training, and an images with no masking applied is provided as the correct answer for training.

The ensemble learning may refer to a training method that combines multiple models to obtain better prediction performance, and may include bagging, boosting, stacking, or voting ensemble learning.

The fake fingerprint detection model may include a physical fake fingerprint detection model and a training fake fingerprint detection model. Accordingly, in the training of the ensemble learning, the physical fake fingerprint detection model and the training fake fingerprint detection model are trained separately, wherein the physical fake fingerprint detection model is trained by receiving a physical fake fingerprint image as an input for training and receiving whether the received image is fake or not as a correct answer for training, and the training fake fingerprint detection model is trained by receiving a training fingerprint image as an input for training and receiving whether the provided image is fake or not as a correct answer for training.

The unique identification information may include at least one of first identification information based on start points, end points and branch points of ridges in a fingerprint of a finger and a branch point of the ridge, second identification information based on orientations of the ridges, and third identification information based on a distribution density of the ridges.

The generation constraints may include information about the sensor that identifies the fingerprint, information about the surrounding environment in which the fingerprint is identified, and labeling information about the fingerprint.

The labeling information may include information about the type of physical means used to generate the physical fake fingerprint image.

The training fingerprint image generation model may be trained to generate different training fingerprint images based on the conditions included in the generation constraints while freezing the unique identification information.

In one embodiment, when the generation constraints include information about the sensor that identifies a fingerprint or information about the surrounding environment in which the fingerprint is identified, the training fingerprint image generation model may acquire training fingerprint images obtained by diversifying the input fingerprint image using at least one of information about temperature, humidity, illuminance, and pressure without forging the input fingerprint image.

In another embodiment, when the generation constraints include information about the sensor that identifies a fingerprint, information about the surrounding environment in which the fingerprint is identified, information about whether the fingerprint in the input fingerprint image is real or fake, and information about the means used to generate the fake fingerprint, the training fingerprint image generation model may acquire training fingerprint images obtained by diversifying the input fingerprint image using at least one of information about temperature, humidity, illuminance, and pressure while forging the input fingerprint image using a virtual forgery means.

In other words, the training fingerprint image generation model may acquire random noise and generate different training fingerprint images based on the random noise even when the same generation constraints are applied.

FIGS. 11 to 14 are example diagrams illustrating a method for training a fake fingerprint detection model according to different embodiments.

Figure 11:
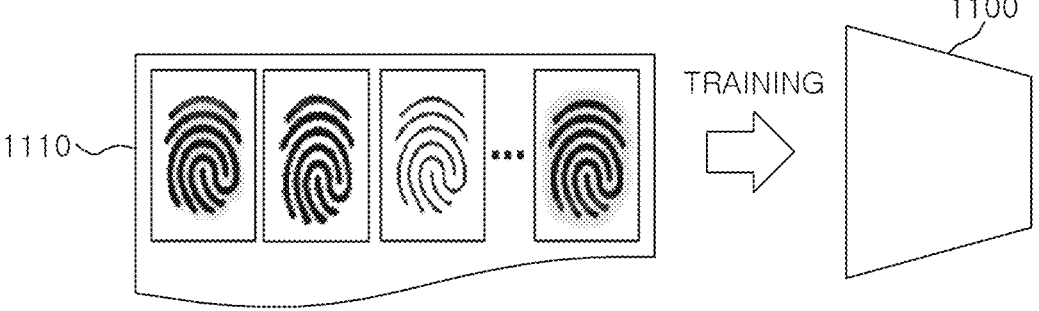
FIGS. 11 to 14 are example diagrams illustrating a method for training a fake fingerprint detection model according to different embodiments.
Figure 12:
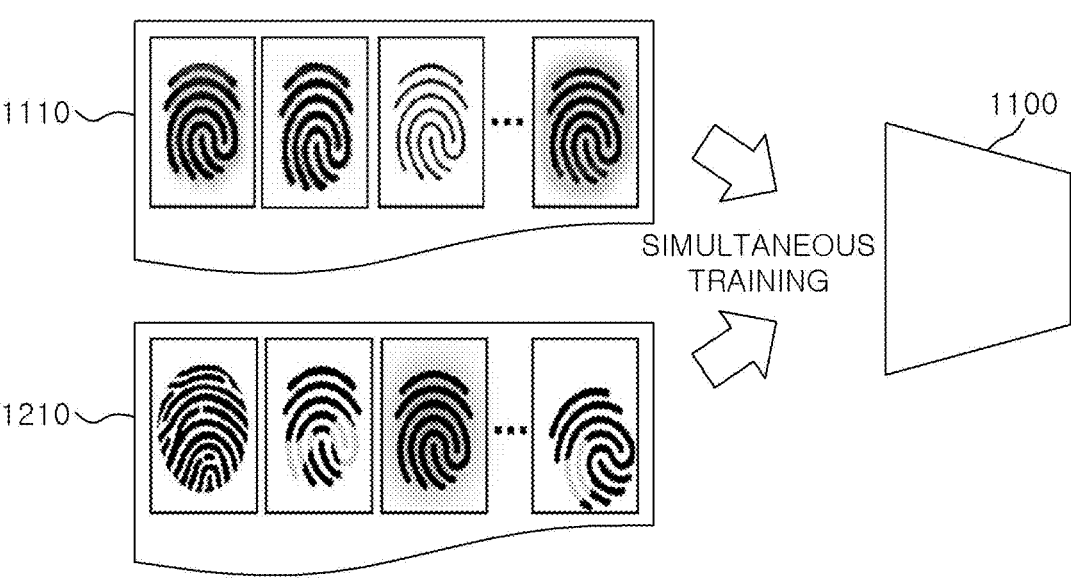

FIG. 11 is an example diagram illustrating a method for training the fake fingerprint detection model according to one embodiment, and FIG. 12 is an example diagram illustrating a method for training the fake fingerprint detection model according to another embodiment.

Referring to FIG. 11, a fake fingerprint detection model 1100 may be trained using training fingerprint images 1110 generated by the training fingerprint image generation model according to one embodiment of the present disclosure. That is, the fake fingerprint detection model 1100 may be trained using only the fake fingerprint images generated by the training fingerprint image generation model that has learned features of a fingerprint image generated without forging a fingerprint obtained from a real fingerprint or a fake fingerprint generated by forging the fingerprint obtained from the real fingerprint.

Referring to FIG. 12, the fake fingerprint detection model 1100 may be trained through simultaneous training using training fingerprint images 1110 generated by the training fingerprint image generation model according to one embodiment of the present disclosure and physical fake fingerprint images 1210 acquired from an actual finger. Accordingly, the fake fingerprint detection model 1100 may be trained by simultaneously utilizing the virtual fingerprint images 1110 generated by the training fingerprint image generation model and the fingerprint image obtained by capturing a fingerprint of a finger or actual fake fingerprint images 1210 created by directly forging the fingerprint of the finger.

As described above, according to one embodiment of the present disclosure, the training fingerprint image generation model or the fake fingerprint detection model can be trained for features of a fake fingerprint obtained from a real fingerprint or a fake fingerprint generated by the training fingerprint image generation model.

In addition, new fake fingerprint image with novel features can be generated by combining the features of the fingerprint images used in the training process. Accordingly, fake fingerprint images with greater diversity than the existing data can be generated, which improves the performance of the training fingerprint image generation model or the fake fingerprint detection model.

Further, a small amount of original fingerprint images can be augmented to obtain a large amount of training fingerprint images. Accordingly, the performance of an artificial intelligence model for detecting fake fingerprints trained based on the training fingerprint images can be improved.

Furthermore, various fingerprint images, which include information that may vary due to external factors such as finger moisture, the surrounding environment, or the characteristics of the sample used to create the fake fingerprint, can be generated. Accordingly, the performance of an artificial intelligence model for detecting fake fingerprints trained based on the various fingerprint images can be improved.

Figure 13:
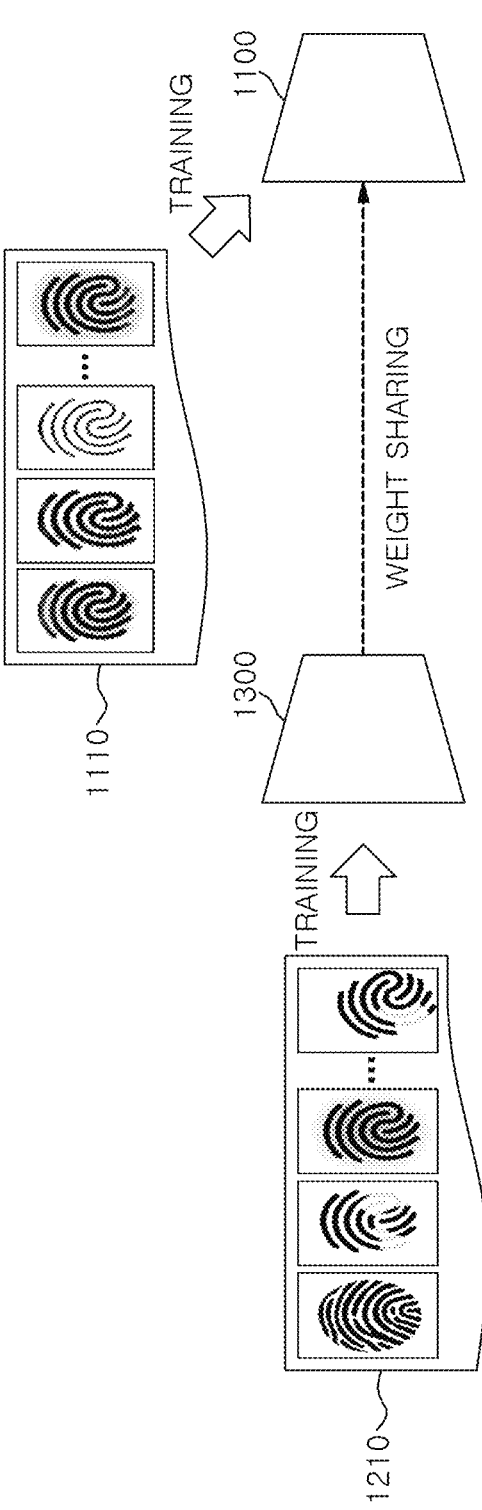

Referring to FIG. 13, the fake fingerprint detection model 1100 may be trained in a transfer learning manner based on training fingerprint images 1110 generated by the training fingerprint image generation model according to one embodiment of the present disclosure and physical fake fingerprint images 1210 acquired from an actual finger. Specifically, by providing the physical fake fingerprint images 1210 to a physical fake fingerprint detection model 1300 for pre-training, weights of the physical fake fingerprint detection model 1300 are pre-determined, and the pre-determined weights are shared with the fake fingerprint detection model 1100, so that the fake fingerprint detection model 1100 can be trained in a transfer learning manner. In addition, the training fingerprint images 1110 are provided for fine-tuning the weights of the fake fingerprint detection model 1100, so that the fake fingerprint detection model 1100 can be additionally trained.

Figure 14:
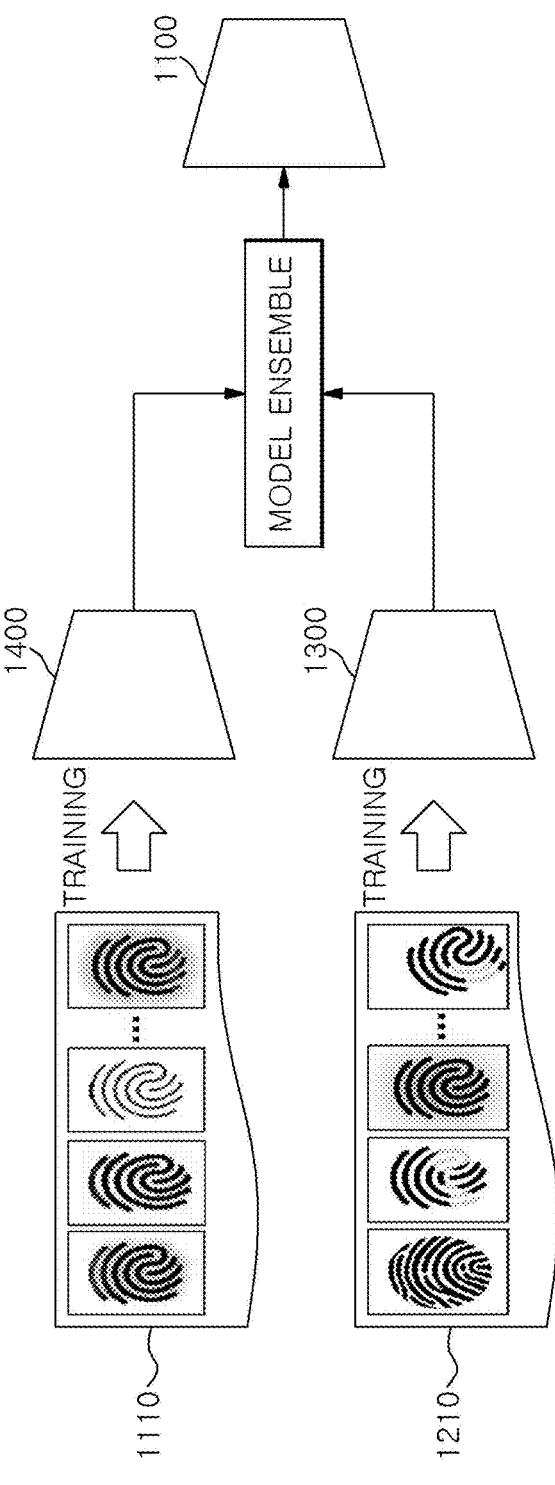

Referring to FIG. 14, the fake fingerprint detection model 1100 may be trained in an ensemble learning manner based on training fingerprint images 1110 generated by the training fingerprint image generation model according to one embodiment of the present disclosure and physical fake fingerprint images 1210 acquired from an actual finger. First, a physical fake fingerprint detection model 1300 may be trained based on the physical fake fingerprint images 1210, and a training fingerprint image discrimination model 1400 may be trained based on the training fingerprint images 1110. Next, the fake fingerprint detection model 1100 may be obtained by combining the physical fake fingerprint detection model 1300 and the training fingerprint image discrimination model 1400 that are trained in an ensemble manner.

As described above, according to one embodiment of the present disclosure, the training fingerprint image generation model or the fake fingerprint detection model can be learned for features of a fake fingerprint obtained from a real fingerprint or a fake fingerprint generated from the training fingerprint image generation model.

In addition, new fake fingerprint images with novel features can be generated by combining the features of the fingerprint images used in the training process. Accordingly, a fake fingerprint images with greater diversity than the existing data can be generated, which improves the performance of the training fingerprint image generation model or the fake fingerprint detection model.

Further, a small amount of original fingerprint images can be augmented to obtain a large amount of training fingerprint images. Accordingly, the performance of an artificial intelligence model for detecting fake fingerprints trained based on the training fingerprint images can be improved.

Furthermore, various fingerprint images, which include information that may vary due to external factors such as finger moisture, the surrounding environment, or the characteristics of the sample used to create the fake fingerprint, can be generated. Accordingly, the performance of an artificial intelligence model for detecting fake fingerprints trained based on the various fingerprint images can be improved.

In addition, the performance of the fake fingerprint detection model can be further improved by training the fake fingerprint detection model through transfer learning or ensemble learning using the training data generated by the aforementioned method.

Combinations of steps in each flowchart attached to the present disclosure may be executed by computer program instructions. Since the computer program instructions can be mounted on a processor of a general-purpose computer, a special purpose computer, or other programmable data processing equipment, the instructions executed by the processor of the computer or other programmable data processing equipment create a means for performing the functions described in each step of the flowchart. The computer program instructions can also be stored on a computer-usable or computer-readable storage medium which can be directed to a computer or other programmable data processing equipment to implement a function in a specific manner. Accordingly, the instructions stored on the computer-usable or computer-readable recording medium can also produce an article of manufacture containing an instruction means which performs the functions described in each step of the flowchart. The computer program instructions can also be mounted on a computer or other programmable data processing equipment. Accordingly, a series of operational steps are performed on a computer or other programmable data processing equipment to create a computer-executable process, and it is also possible for instructions to perform a computer or other programmable data processing equipment to provide steps for performing the functions described in each step of the flowchart.

In addition, each step may represent a module, a segment, or a portion of codes which contains one or more executable instructions for executing the specified logical function(s). It should also be noted that in some alternative embodiments, the functions mentioned in the steps may occur out of order. For example, two steps illustrated in succession may in fact be performed substantially simultaneously, or the steps may sometimes be performed in a reverse order depending on the corresponding function.

The above description is merely exemplary description of the technical scope of the present disclosure, and it will be understood by those skilled in the art that various changes and modifications can be made without departing from original characteristics of the present disclosure. Therefore, the embodiments disclosed in the present disclosure are intended to explain, not to limit, the technical scope of the present disclosure, and the technical scope of the present disclosure is not limited by the embodiments. The protection scope of the present disclosure should be interpreted based on the following claims and it should be appreciated that all technical scopes included within a range equivalent thereto are included in the protection scope of the present disclosure.

What is claimed is:

1. A method for training a fake fingerprint detection model, performed by a training device for the fake fingerprint detection model, the method comprising:

acquiring a physical fake fingerprint image generated in a physical manner targeting a finger;

providing generation constraints and a unique identification information to a training fingerprint image generation model;

generating a training fingerprint image to be used for training the fake fingerprint detection model by using the training fingerprint image generation model; and training the fake fingerprint detection model using the physical fake fingerprint image and the training fingerprint image in a transfer learning manner or an ensemble learning manner, wherein the training fingerprint image generation model is trained to generate different training fingerprint images based on conditions included in the generation constraints.

2. The method of claim 1, wherein in the transfer learning manner, the physical fake fingerprint image is used for pre-training and the training fingerprint image is used for fine-tuning.

3. The method of claim 2, wherein in the pre-training, an image with masking applied to a portion of the physical fake fingerprint image is provided as an input for training, and an image with no masking applied is provided as a correct answer for training.

4. The method of claim 1, wherein the fake fingerprint detection model includes a physical fake fingerprint detection model and a training fake fingerprint detection model, and wherein in the training of the ensemble learning manner, the physical fake fingerprint detection model and the training fake fingerprint detection model are trained separately, the physical fake fingerprint detection model is trained by receiving the physical fake fingerprint image as an input for training and receiving whether the received image is fake or not as a correct answer for training, and the training fake fingerprint detection model is trained by receiving the training fingerprint image as an input for training and receiving whether the received image is fake or not as a correct answer for training.

5. The method of claim 1, wherein the unique identification information includes at least one of first identification information based on start points, end points and branch points of ridges in a fingerprint of the finger, second identification information based on orientations of the ridges, and third identification information based on a distribution density of the ridges.

6. The method of claim 5, wherein the generation constraints include information about a sensor that identifies the fingerprint, information about surrounding environment in which the fingerprint is identified, and labeling information about the fingerprint.

7. The method of claim 6, wherein the labeling information includes information about a type of physical means used to generate the physical fake fingerprint image.

8. The method of claim 1, wherein the training fingerprint image generation model acquires random noise and generates different training fingerprint images according to the random noise even when same generation constraints are applied.

9. A device for training a fake fingerprint detection model, the device comprising:

a memory storing computer-executable instructions; and a processor for executing the instructions to:

acquire a physical fake fingerprint image generated in a physical manner targeting a finger;

provide generation constraints and a unique identification information to a training fingerprint image generation model;

generate a training fingerprint image to be used for training the fake fingerprint detection model by using the training fingerprint image generation model; and train the fake fingerprint detection model using the physical fake fingerprint image and the training fingerprint image in a transfer learning manner or an ensemble learning manner, wherein the training fingerprint image generation model is trained to generate different training fingerprint images based on conditions included in the generation constraints.

10. The device of claim 9, wherein in the transfer learning manner, the physical fake fingerprint image is used for pre-training and the training fingerprint image is used for fine-tuning.

11. The device of claim 10, wherein in the pre-training, an image with masking applied to a portion of the physical fake fingerprint image is provided as an input for training, and an image with no masking applied is provided as a correct answer for training.

12. The device of claim 9, wherein the fake fingerprint detection model includes a physical fake fingerprint detection model and a training fake fingerprint detection model, and wherein in the training of the ensemble learning manner, the physical fake fingerprint detection model and the training fake fingerprint detection model are trained separately, the physical fake fingerprint detection model is trained by receiving the physical fake fingerprint image as an input for training and receiving whether the received image is fake or not as a correct answer for training, and the training fake fingerprint detection model is trained by receiving the training fingerprint image as an input for training and receiving whether the received image is fake or not as a correct answer for training.

13. The device of claim 9, wherein the unique identification information includes at least one of first identification information based on start points, end points and branch points of ridges in a fingerprint of the finger, second identification information based on orientations of the ridges, and third identification information based on a distribution density of the ridges.

14. The device of claim 13, wherein the generation constraints include information about a sensor that identifies the fingerprint, information about surrounding environment in which the fingerprint is identified, and labeling information about the fingerprint.

15. The device of claim 14, wherein the labeling information includes information about a type of physical means used to generate the physical fake fingerprint image.

16. The device of claim 9, wherein the training fingerprint image generation model acquires random noise and generates different training fingerprint images according to the random noise even when same generation constraints are applied.

17. A non-transitory computer-readable recording medium storing computer-executable instructions, wherein the computer-executable instructions, when executed by a processor, cause the processor to perform a method for training a fake fingerprint detection model, the method comprising:

acquiring a physical fake fingerprint image generated in a physical manner targeting a finger;

providing generation constraints and a unique identification information to a training fingerprint image generation model;

generating a training fingerprint image to be used for training the fake fingerprint detection model by using the training fingerprint image generation model; and training the fake fingerprint detection model using the physical fake fingerprint image and the training fingerprint image in a transfer learning manner or an ensemble learning manner, wherein the training fingerprint image generation model is trained to generate different training fingerprint images based on conditions included in the generation constraints.

\* \* \* \* \*